(12) United States Patent
Herrmann

(10) Patent No.: US 9,580,016 B2
(45) Date of Patent: Feb. 28, 2017

(54) ASSEMBLY FOR ADJUSTING THE OUTSIDE MIRROR

(75) Inventor: Andreas Herrmann, Winnenden-Baach (DE)

(73) Assignee: SMR PATENTS S.A.R.L., Le Dome (LU)

( * ) Notice: Subject to any disclaimer, the term of this patent is extended or adjusted under 35 U.S.C. 154(b) by 519 days.

(21) Appl. No.: 14/122,066

(22) PCT Filed: May 21, 2012

(86) PCT No.: PCT/EP2012/059396
§ 371 (c)(1),
(2), (4) Date: Dec. 16, 2013

(87) PCT Pub. No.: WO2012/163717
PCT Pub. Date: Dec. 6, 2012

(65) Prior Publication Data
US 2014/0098437 A1    Apr. 10, 2014

(30) Foreign Application Priority Data

May 31, 2011 (DE) .......................... 10 2011 103 198

(51) Int. Cl.
| | | |
|---|---|---|
| *B60R 1/07* | (2006.01) |
| *B60R 1/072* | (2006.01) |
| *B29C 45/14* | (2006.01) |
| *B29L 31/30* | (2006.01) |

(52) U.S. Cl.
CPC .............. *B60R 1/072* (2013.01); *B29C 45/14* (2013.01); *B29C 45/14467* (2013.01); *B29L 2031/30* (2013.01)

(58) Field of Classification Search
CPC ......... B60R 1/025; B60R 1/06; B60R 1/0607; B60R 1/0612; B60R 1/062; B60R 1/07; B60R 1/072; B69R 1/00–1/10
USPC ................................ 359/843, 871–874, 877
See application file for complete search history.

(56) References Cited

U.S. PATENT DOCUMENTS

| | | | |
|---|---|---|---|
| 5,210,651 A * | 5/1993 | Shibuya .................. | B60R 1/074 248/479 |
| 6,398,376 B2 * | 6/2002 | Englander ............. | B60R 1/0605 359/864 |
| 6,824,282 B1 * | 11/2004 | Morrell ................... | B60R 1/025 359/874 |
| 7,360,908 B1 * | 4/2008 | Duroux ................... | B60R 1/074 359/841 |

(Continued)

FOREIGN PATENT DOCUMENTS

| | | |
|---|---|---|
| DE | 31 20 627 A1 | 12/1981 |
| DE | 40 18 409 A1 | 12/1991 |

(Continued)

*Primary Examiner* — Bumsuk Won
*Assistant Examiner* — Jeffrey Madonna
(74) *Attorney, Agent, or Firm* — Jones Day

(57) ABSTRACT

An adjustment assembly for adjusting the reflecting surface of a glass assembly in an external rearview vehicle mirror, where two linear adjusting motors act on two points of the glass assembly, where the adjusting motors are positioned between the glass assembly and a mirror carrier in the mirror head. The adjusting motors are connected to the glass assembly and/or the mirror carrier via at least one elastomeric connecting piece.

7 Claims, 2 Drawing Sheets

(56) References Cited

U.S. PATENT DOCUMENTS

| | | | |
|---|---|---|---|
| 2002/0047386 A1* | 4/2002 | Bingle | B60R 1/072 310/89 |
| 2004/0090691 A1* | 5/2004 | Fukai | B60R 1/072 359/877 |
| 2005/0213229 A1* | 9/2005 | Cofer | B60R 1/025 359/843 |
| 2007/0285812 A1* | 12/2007 | Foote | B60R 1/072 359/877 |
| 2008/0152333 A1* | 6/2008 | Yamasaki | G02B 27/646 396/55 |
| 2010/0328795 A1* | 12/2010 | Ferman | B60R 1/06 359/871 |
| 2012/0128866 A1 | 5/2012 | Eichlseder et al. | |

FOREIGN PATENT DOCUMENTS

| | | |
|---|---|---|
| DE | 10 2009 022 238 A1 | 11/2010 |
| EP | 0 460 666 B1 | 12/1994 |
| EP | 2 208 643 A1 | 7/2010 |
| WO | WO 03/004245 A1 | 1/2003 |
| WO | WO 2005/009519 A1 | 10/2005 |

* cited by examiner

PRIOR ART

ASSEMBLY FOR ADJUSTING THE OUTSIDE MIRROR

CROSS REFERENCE TO RELATED APPLICATION

This application is a national stage application of International Application No. PCT/EP2012/059396 filed on May 21, 2012, which claims the benefit of Germany Patent Application No. 10 2011 103 198.0 filed on May 31, 2011, the entire contents of both applications being incorporated herein by reference.

The embodiments of the present invention relate to an external rearview vehicle mirror, in particular, the embodiments of the present invention are related to an adjustment assembly for such an external rearview mirror, and a method for manufacturing the adjustment assembly.

BACKGROUND OF THE INVENTION

External rearview vehicle mirrors increasingly comprise electrical means for adjusting the glass. Glass actuators in a built-in casing are used as independent components for this purpose. These glass typically actuators include two motors that drive adjustment systems. Alternatively, separate drives can be used.

In the known external vehicle mirrors that can be electrically actuated, a mirror carrier that can be tilted is attached to a housing and two drive motors are coupled with the mirror carrier. The drive motors are attached at a 90° offset with reference to the pivot points of the mirror carrier. They are designed as rotary electric motors and move the mirror via a transmission and gear racks and their counterparts are attached to the mirror carrier. The tilting motion can in principle, be implemented using a single motor, but this would require an increased mechanical effort. A simple design can be achieved using two motors.

Due to the many parts (motors, transmissions, gear racks, etc.), the assembly effort required is considerable even if two rotary electric motors are used.

DE 40 18 409 A1 describes an arrangement in which hinged linear motors are used for adjusting the mirror glass. The solution uses rotor bars on ball bearings and electric linear motors for adjusting the mirror.

A non-generic adjustment assembly without linear adjusting motors is known from WO 2005/095 159 A1 (corresponding to U.S. Patent Publication No. 2005/0213229 A1, published on Sep. 29, 2005).

A method for manufacturing an adjustment assembly is known from WO 03/004 245 A1 (corresponding to U.S. Pat. No. 6,638,454, issued on Oct. 8, 2003).

SUMMARY OF THE PRESENT INVENTION

The embodiments of the present invention provide an external rearview vehicle mirror that can be actuated electrically, has a simple mechanical design, and can be manufactured cost-effectively.

This problem is solved according to the embodiments of the present invention in that the drive motors are designed as molded-on electric linear motors, which are actuated by a controller located in the external rearview mirror.

BRIEF DESCRIPTION OF THE DRAWINGS

The embodiments of the present invention will be explained below with reference to the figures.

DETAILED DESCRIPTION OF THE INVENTION

Figure 1:
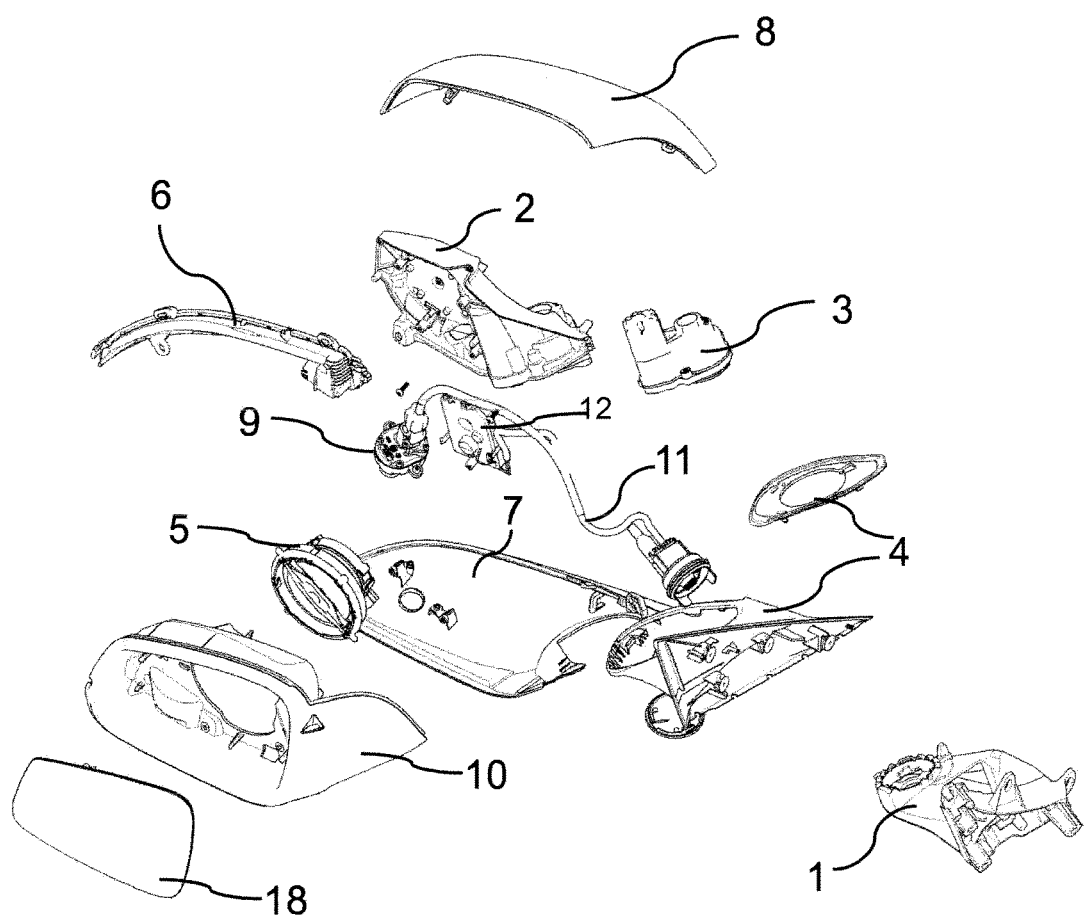
FIG. 1 shows an exploded view of an external rearview mirror.

The embodiments of the present invention will be described below for an external rearview vehicle mirror. FIG. 1 shows an external rearview mirror arrangement as used in prior art. The external mirror includes of a mirror head and mirror base 1, wherein the mirror head is rotatably mounted to the mirror base 1. In FIG. 1, the mirror base 1 is connected to a pivot pin 3, and via the pivot pin 3, to a mirror carrier 2 in the mirror head. These components are preferably made of metal or plastic or a combination of these two materials and represent the load-bearing structure of the external rearview mirror.

The mirror base 1 is mounted to the vehicle. It is covered by plastic components, the mirror base covers 4.

A glass drive assembly 5 is mounted to the mirror carrier 2 and is preferably connected to a glass assembly 18. The glass assembly 18 includes of a conventional glass mirror with a carrier plate preferably made of plastic that protects and carries the glass and establishes the connection to the glass drive assembly 5. In another embodiment includes, the glass assembly 18 may be made of plastic glass, that is, a mirror glass made of a coated plastic substrate with a reflecting side and a carrier side into which the fastening means for a glass drive assembly 5 are integrated. The mirror head is covered by the mirror head housing components 7, 8, and 10. In the example shown in FIG. 1, a turn signal module 6 is also integrated in the mirror head housing components 7, 8, and 10. An actuator 9 for the glass drive assembly 5 is connected to a controller 12, which itself comprises a connection 11 to the vehicle.

The glass drive assembly 5 preferably includes two motors that engage in gear racks, the ends of which are attached to the glass assembly 18 and can therefore pivot the mirror glass. The glass drive assemblies 5 are preferably delivered as a complete unit in suitable housings. Alternatively, FIG. 2 shows an adjustment assembly with separate drives.

Figure 2:
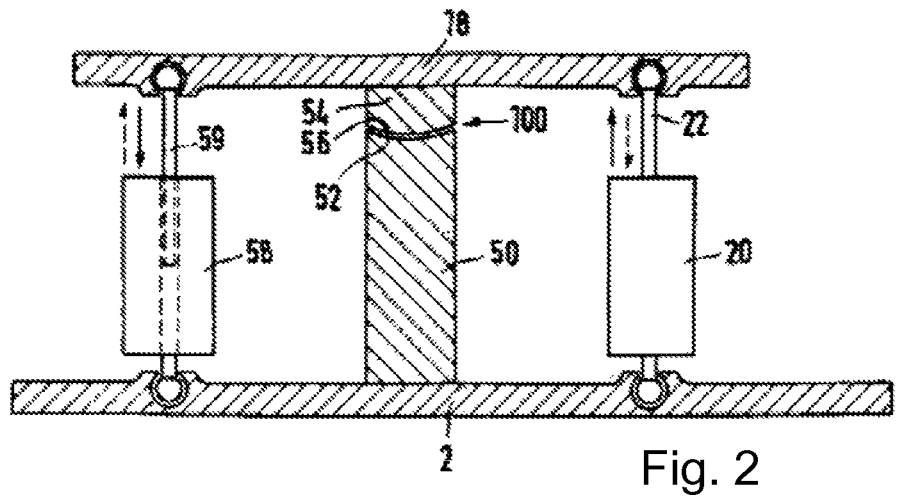
FIG. 2 shows an embodiment with linear motors according to prior art.

According to FIG. 2, a tilting bearing 100 that comprises a support 50 on the mirror carrier 2 and a block 54 on the back side of the glass assembly 18 is installed between the glass assembly 18 and the mirror carrier 2. The support 50 has a concave bearing shell 52 that receives a convex bearing surface 56 of the block 54. A linear adjusting motor 20 is shown on the right in FIG. 2. One of its ends is pivoted in a recess of the mirror carrier 2. The rotor 22 is articulated to the rear side of the glass assembly 18 by means of a ball joint.

The bearing elements 52, 56 define a pivot point M. A friction element 58 is arranged symmetrically to this pivot point M on the side opposite the linear adjusting motor 20 and pivoted like the adjusting motor 20. The cylindrical friction element 58 defines a specific static friction and a specific dynamic friction between its axle 59 and the body surrounding the axle 59.

If the linear adjusting motor 20 moves the rotor 22 in the direction of the continuous arrow, the mirror carrier tilts counterclockwise about the tilting bearing 100, wherein the axle 59 dips into the friction element 58 in the direction of the extended arrow. If the rotor 22 is retracted, the mirror carrier 18 tilts clockwise, and the rotor 22 and the axle 59 of the friction element 58 then move in the direction of the dashed arrows.

A similar arrangement as shown in FIG. 2 is provided for the other tilting axis, such that a similar image results when looking at the arrangement according to FIG. 2 from an angle offset by 90°.

This prior art solution requires sophisticated friction elements in addition to the linear adjusting motor 20.

Figure 3:
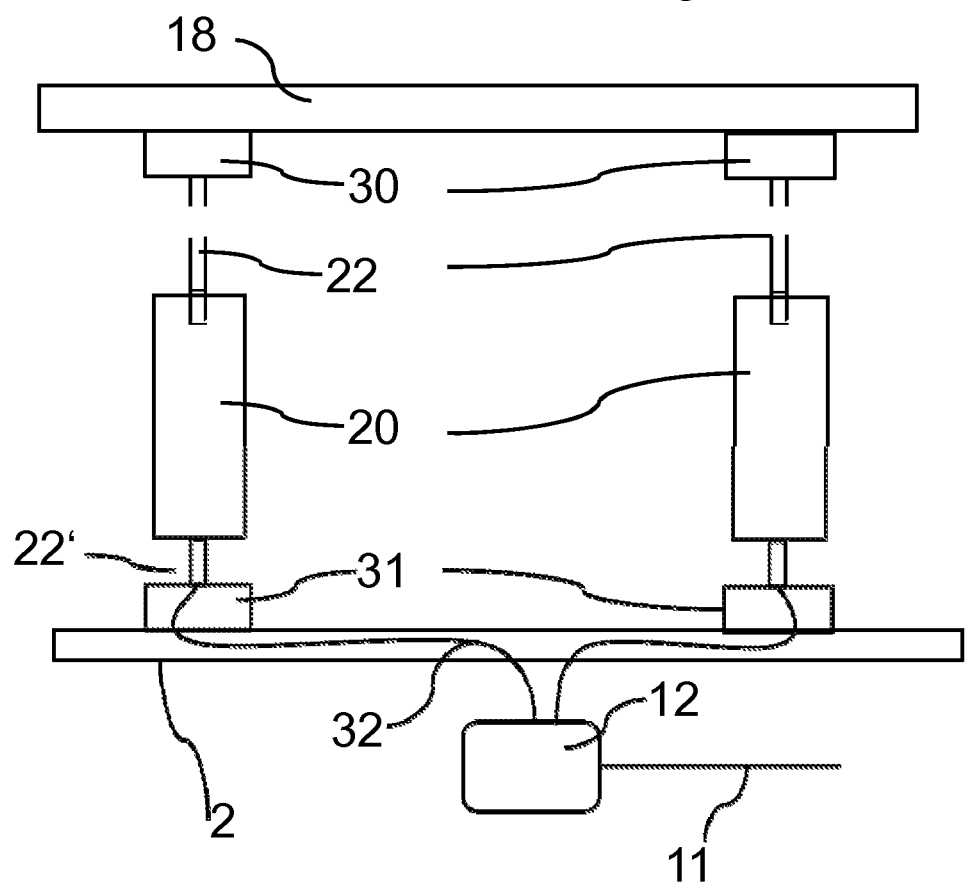
FIG. 3 shows an embodiment of the adjustment assembly according to the embodiments of the present invention.

FIG. 3 shows an adjustment assembly according to the embodiments of the present invention. The tilting bearing was left out of this depiction. Any bearing that defines a center of articulation between the glass assembly and the mirror carrier is suitable for executing the embodiments of the present invention. A person of ordinary skill in the art in the art may use any solution he or she is familiar with.

The glass assembly 18 is therefore connected to the mirror carrier 2 via a bearing (not shown here) and two linear adjusting motors 20.

The linear adjusting motor 20 with a rotor 22 is equipped with an elastomeric connecting piece 31 at its end. On its other end, the rotor 22 is connected to another elastomeric connecting piece 30 that is linked to the glass assembly 18. An electrical connection 32 extends from the linear adjusting motor 20 to a controller 12 that has a connection 11 to the vehicle.

The two drives shown are arranged at an offset, such that actuation of the linear extension or reduction of the rotor 22, 22' can bring about any desired positioning.

It is preferred that linear adjusting motors with piezo motors are used. These replace the classic drive systems such as motor spindle systems or magnetic linear motors. The piezoelectric positioners include a rotor that is preloaded by piezo motors. Piezoelectric positioners fit into highly compact designs, and rapid adjustment is an advantage. Furthermore, piezoelectric positioners have a high degree of self-locking, and if they are used as mirror glass positioners they ensure that the glass assembly 18 is securely supported and locked. Additional locking mechanisms can be eliminated.

The embodiment according to the present invention in which the glass assembly 18 does not contain a mirror made of mineral glass but a plastic substrate onto which a metal layer is deposited is particularly advantageous. For this purpose, a plastic substrate of high optical quality is produced and a metallic layer, for example, chromium, aluminum, or titanium or a mixture, is deposited onto one or both surfaces of the plastic substrate using a suitable method. Plastic mirrors are by several orders of magnitude lighter than conventional glass mirrors. They can easily be guided by the glass positioners, and the piezoelectric positioners do not need to be designed for large adjusting forces, which makes the entire design more lightweight and cost-effective.

The adjustment assembly include the glass assembly 18, two linear adjusting motors 20, and the connecting pieces 31 and 30 to the mirror carrier and to the glass assembly 18.

The adjustment assembly is manufactured preferably in an injection molding process. In a first step, the adjusting motor 20 is equipped with an elastomeric connecting piece 31 on the side that will later have be connected to the mirror carrier. In one embodiment, it is molded directly onto the motor.

Alternatively, the connecting piece 31 can be mounted onto the motor.

In another embodiment, either a plastic mirror is manufactured or a glass carrier plate is injection molded for the glass assembly 18. For the plastic mirror, a substrate is manufactured in a special injection molding process that is described in EP 1 412 158 A0 (corresponding to U.S. Pat. No. 6,638,454, issued on Oct. 8, 2003). The connecting element 30 is then preferably directly molded onto the plastic substrate in another injection molding step after the linear adjusting motor 20 with its rotor 22 placed in the die. The linear adjusting motor 20 with its rotor is preferably placed at a defined distance from the plastic substrate or the carrier plates into the second injection molding die such that this distance is filled with elastomeric material in an extrusion coating process and the two components are joined. The rotor 22 is directly molded onto the plastic substrate of the plastic mirror, resulting in a positive and friction-locked joint. The assembling effort is eliminated by directly joining the linear adjusting motor 20 with the glass assembly 18. The connecting piece 30 is preferably made of an elastomeric material so that the angle between the glass assembly 18 and the rotor 22 can adapt to the adjusting forces up to a threshold value determined by the elasticity coefficient of the material.

The plastic injection molding method is preferably either a 2K method in an injection molding machine wherein the components are manufactured in two dies and use two materials, or the carrier plate or the plastic mirror are manufactured in a separate process and inserted into a second plastic injection molding machine and equipped with the connecting pieces.

It is preferably, in particular, when using plastic mirrors, that the depositing step is performed before the connecting piece is molded onto the linear adjusting motors.

The components comprising of the glass assembly 18 and the linear adjusting motors are assembled by means of the connecting pieces 31, which are clipped into suitable devices of the mirror carrier 2 or fastened in another way. The bearing is therefore designed such that the bearing components are joined when connecting the linear adjusting motors 20.

Both linear adjusting motors 20 are preferably actuated to adjust the mirror. They are actuated by means of contacting and connection to a controller. Such controllers 12 in the external rearview mirror are used for actuating all electrical functions available in the external rearview mirror. Advantageously, the control functions are performed by a controller 12 that is also used as a LIN bus node. In this way, the controller 12 is directly connected to the vehicle bus and its nodes via the bus connection.

Since a controller 12 is used, the two linear adjusting motors 20 can be actuated such that the two linear adjusting motors are not moved separately but in a coordinated manner relative to one another. In this way, tilting of the rotor axle and the resulting strain on the elastomeric connecting pieces by shear forces can be prevented.

The invention claimed is:

1. An adjustment assembly in an external rearview vehicle mirror comprising:
    a mirror head comprising a glass assembly and a mirror carrier; and
    at least two linear adjusting motors acting on at least two points of a single reflective mirror element of the glass assembly,
    wherein the adjusting motors are positioned between the glass assembly and the mirror carrier in the mirror head,
    wherein the adjusting motors are connected to the glass assembly and the mirror carrier via at least one elastomeric connecting piece, wherein the adjustment assembly adjusts the reflecting surface of the glass assembly, and wherein the adjusting motors comprise rotors that are extrusion coated with at least one elastomeric connecting piece.

2. The adjustment assembly according to claim 1, wherein the adjusting motors are piezo motors.

3. The adjustment assembly according to claim 1, wherein the adjusting motors are actuated using a controller built into the external rearview vehicle mirror.

4. The adjustment assembly according to claim 3, wherein the controller is part of a vehicle electrical routing bus system.

5. The adjustment assembly according to claim 1, wherein the glass assembly is a plastic substrate with a reflecting layer.

6. The adjustment assembly according to claim 1, wherein the glass assembly is a plastic carrier plate with a mineral mirror glass.

7. A method for manufacturing an adjustment assembly according to claim 1 comprising the following steps:

injection molding of a plastic carrier plate or a plastic mirror substrate in a first injection molding die for manufacturing at least a part of the glass assembly;

inserting the adjusting motors into a second injection molding die at a defined distance from the at least one part of the glass assembly; and molding the rotor of the adjusting motors with an elastomeric plastic to the glass assembly in the second injection molding die.

\* \* \* \* \*